United States Patent
Usman

(10) Patent No.: US 9,691,139 B2
(45) Date of Patent: Jun. 27, 2017

(54) ADAPTIVE CONTRAST IN IMAGE PROCESSING AND DISPLAY

(71) Applicant: Razzor Technologies Inc., Irvine, CA (US)

(72) Inventor: Mohammad Usman, Mission Viejo, CA (US)

(73) Assignee: Razzor Technologies, Irvine, CA (US)

(*) Notice: Subject to any disclaimer, the term of this patent is extended or adjusted under 35 U.S.C. 154(b) by 0 days.

(21) Appl. No.: 15/025,270

(22) PCT Filed: Dec. 5, 2014

(86) PCT No.: PCT/US2014/068709
§ 371 (c)(1),
(2) Date: Mar. 26, 2016

(87) PCT Pub. No.: WO2015/085130
PCT Pub. Date: Jun. 11, 2015

(65) Prior Publication Data
US 2016/0335750 A1      Nov. 17, 2016

Related U.S. Application Data

(60) Provisional application No. 61/913,281, filed on Dec. 7, 2013.

(51) Int. Cl.
*G06K 9/00* (2006.01)
*G06T 5/00* (2006.01)
(Continued)

(52) U.S. Cl.
CPC ............... *G06T 5/008* (2013.01); *G06T 5/40* (2013.01); *H04N 1/6019* (2013.01);
(Continued)

(58) Field of Classification Search
CPC .......... G06T 5/001; G06T 5/009; G06T 5/40; H04N 9/045; H04N 1/6027; H04N 1/60; H04N 9/69; H04N 9/73; H04N 9/735; H04N 1/40012; H04N 1/40018; H04N 1/40025; H04N 1/40031; H04N 1/40037; H04N 1/40043; H04N 1/4005;
(Continued)

(56) References Cited

U.S. PATENT DOCUMENTS

2012/0263366 A1* 10/2012 Huo ................... G06T 5/009
382/132

OTHER PUBLICATIONS

Kurt et al. ("Medical images enhancement by using anisotropic filter and CLAHE", IEEE Conference Publications, pp. 1-4, Published on 2012).*

* cited by examiner

Primary Examiner — Duy M Dang
(74) Attorney, Agent, or Firm — Thomas J. Lavan

(57) ABSTRACT

Methods of producing an output image with enhanced contrast are disclosed. A first set of methods is adaptive and region-based and comprises dividing a digital input image comprised of input image luma pixels into a plurality of blocks, and for each of the blocks, applying certain statistical analyses and computations to produce output image pixel data, communicating the output image pixel data to an image display device, and displaying the output image. A second set of methods is adaptive and uses human vision basis functions. A device for producing an output image with enhanced contrast is also disclosed.

26 Claims, 12 Drawing Sheets

(51) Int. Cl.
    *G06T 5/40*      (2006.01)
    *H04N 19/86*     (2014.01)
    *H04N 1/60*      (2006.01)
(52) U.S. Cl.
    CPC .... *H04N 19/86* (2014.11); *G06T 2207/10024* (2013.01); *G06T 2207/20012* (2013.01); *G06T 2207/20021* (2013.01)
(58) Field of Classification Search
    CPC ........... H04N 1/40056; H04N 1/40062; H04N 1/40068; H04N 1/40075
    See application file for complete search history.

ADAPTIVE CONTRAST IN IMAGE PROCESSING AND DISPLAY

CROSS-REFERENCE TO RELATED PATENT APPLICATIONS

This application is a continuation of International Application No. PCT/US14/68709, filed Dec. 5, 2014, which claims the benefit of U.S. Provisional Application No. 61/913,281 filed Dec. 7, 2013, the disclosure of which is incorporated herein by reference.

BACKGROUND

Technical Field

Color image processing and display, and in particular, rendering of color images that are perceived to be of high aesthetic quality.

Description of Related Art

Current techniques for the rendering of high quality color images are mostly "frame" based. Other techniques for rendering of high quality color images are "region" based. One issue with region based techniques is that they are computationally complex. Additionally, they have been most effectively used for processing of individual color images, rather than a sequence of images that are provided at a high rate, such as a sequence of images in a movie or video. To a large extent, this is because in region-based image processing and rendering, the size of regions needs to be large, many artifacts are produced, and changes in contrast are not rendered well. Consequently, the images rendered and displayed from a video or movie sequence are often not perceived by viewers to be of adequate quality. At the very least, it can be said that there is considerable opportunity to improve the image quality, such that when a typical observer (such as a customer in a theatre) is presented with a video or movie of improved image quality, the will appreciate the improvement over prior viewing experiences, i.e., the observer "will know it when he sees it."

One known method that is used in frame based image processing and display is Contrast Limited Adaptive Histogram Equalization (CLAHE). CLAHE is typically applied on a frame-by-frame basis. FIG. 1 is a flowchart that depicts the steps of a basic algorithm of CLAHE. The steps performed in executing the algorithm are as follows:

1) In step 10, a movie frame or image is "read," i.e., provided as a digital image or sequence of digital images. The digital images are comprised of image pixels that are typically defined using RGB tristimulus values.

2) In step 20, for image pixels defined by RGB tristimulus values, optionally, convert the RGB tristimulus values to values of another color space, such as YUV, HSV, or IPT.

3) In step 40, for the entire image frame, compute the histogram h[n] of the luma or intensity pixel values. (For an eight bit grey scale, the range of the values will be from 0-255.

4) In step 45, apply a predetermined/programmable threshold to the image; and in step 50, uniformly redistribute all the histogram values that exceed the threshold among the remainder of the histogram bins.

5) If any histogram values of the revised distribution exceed the threshold, then repeat step 50, redistributing all the histogram values that exceed the threshold among the remainder of the histogram bins.

6) If no histogram values exceed the threshold, then in step 60, compute the cumulative histogram c(n) wherein c(n)=h(n)+h(n−1).

7) In step 70, compute an Input/Output curve q(n), by scaling the cumulative histogram so that c(255)=255. As a result, the IO-curve thus defines a Look-Up Table (LUT).

8) In step 80, apply the IO-curve to compute new intensity values, replacing each luma pixel p(x,y) in the frame by q(p(x,y)), i.e., a pixel value defined by the IO-curve q(n).

9) In step 90, convert the pixel values in YUV, HS, or IPT to RGB tristimulus pixel values. Display the image defined by the RGB values, or use the pixel values of the image for other image processing purposes.

CLAHE methods, such as those defined by FIG. 1, have certain shortcomings, including at least some or all of the following:

The frame based CLAHE algorithm results in very dark and very bright regions that are normally unacceptable for contrast improvement.

"Local versions" of the algorithm, i.e., executing the algorithm in small regions in a larger image results in non-uniform dark and bright areas in the output image. In order to produce an image that is perceived by an observer to be of high quality, these areas need to undergo further image processing. The occurrence of sharp intensity variations in an image, i.e. non-uniform dark and bright areas in close proximity to each other, is a consequence of the use of different IO curves for different regions, which thus lack "neighborhood knowledge," i.e. for a given area, lacking in consideration of nearby areas that are much darker or brighter.

There are conflicting requirements and/or tradeoffs in using CLAHE algorithms. In processing images via CLAHE, a given region size must be large enough, i.e., have enough pixels to make a proper histogram; however, the region size must also be small enough to adapt to local intensity variations. These constraints put limits on the region size.

The use of a high threshold on a histogram results in a highly non-linear IO-curve and is unacceptable for processing most images.

The threshold is set to be of a uniform value, which can be disadvantageous, as will be explained subsequently herein.

In uniform regions of an image such as clouds or sky, image contrast will be stretched within a very narrow intensity area on the histogram, where it is desirable that image contrast not be modified.

Also in uniform region of an image, if there is film grain noise or coding noise present, then such noise will be significantly amplified in the output image.

The brightness level of an image is not controlled when using CLAHE. An increase in output image brightness is needed in most cases in order for an observer to perceive the output image as being of high quality.

To the best of the Applicants' knowledge, CLAHE algorithms do not accept input that defines the level of contrast improvement that is desired.

In view of the shortcomings of prior art image processing and display methods, there remains a need for improving the contrast of color images, so as to provide color images that are perceived by an observer to be of higher quality.

SUMMARY

The present invention meets this need by providing methods for improving image contrast, and thus overall perceived image quality.

One aspect of the invention is based on the discovery of methods for performing adaptive, region based, dynamic contrast enhancement in an image or sequence of images. The methods may be implemented by the use of image processing software executed on a computer that includes a central processing unit (CPU), or by real-time image and video processing hardware and architecture and/or firmware, such as a field-programmable gate array (FPGA), digital signal processor (DSP), graphics processing unit (GPU), Application Specific Integrated Circuit (ASIC), System-on-Chip (SoC), or System-in-a-Package (SiP).

In a first set of the methods, major improvements are made to frame based Contrast Limited Adaptive Histogram Equalization (CLAHE), wherein the CLAHE is region based, rather than frame based as currently practiced in the art. The CLAHE method of the present invention may include at least one of using a variable threshold, using two or more thresholds instead of one to reduce noise, and having no redistribution of intensity values. In certain embodiments, further improvements are made in sub-frame processing, which may include region based extension, variable threshold per region, averaging of IO curves, and brightness control.

More specifically, in accordance with the present disclosure, a method of producing an image with enhanced contrast is provided comprising dividing a digital input image comprised of input image luma pixels into a plurality of blocks, and for each of the blocks, applying certain statistical analyses and computations to produce output image pixel data, communicating the output image pixel data to an image display device, and displaying the output image.

For each of the blocks, the statistical analyses and computations include applying a predetermined threshold value to the histogram bins of the histogram, wherein for any histogram bin containing a quantity of luma pixels that exceeds the threshold value, the number of luma pixels in excess of the threshold value are distributed evenly among histogram bins that do not contain a quantity of luma pixels that exceeds the threshold value, thereby computing a revised histogram of values of luma pixels in the histogram bins. The threshold value is then applied iteratively, i.e., for each of the blocks, it is repeatedly determined if the revised histogram contains a quantity of luma pixels that exceeds the threshold value. If so, the predetermined threshold value applied to the histogram bins of the revised histogram, distributing luma pixels in excess of the threshold value evenly among histogram bins that do not contain a quantity of luma pixels that exceeds the threshold value. A new histogram of values of luma pixels in the histogram bins is computed. These steps are repeated until the new histogram of values of luma pixels does not contain a quantity of luma pixels that exceeds the threshold value.

Subsequently, for each of the blocks: a cumulative histogram is computed, and each cumulative histogram is scaled to compute an input output (IO) curve; the respective IO-curves are applied to the input pixel intensities to determine initial output pixel intensities; boundary portions defined, which are contiguous with neighboring blocks; and the output pixel intensities of each of the boundary portions are averaged with the output pixel intensities of the respective contiguous neighboring blocks to define averaged output pixel intensities of each of the boundary portions. The resulting blocks comprised of pixels with averaged output pixel intensities are compiled to produce output image pixel data. An image data receiving device receives the output image pixel data. The data receiving device may be a display, which displays the resulting output image.

In embodiments in which it is desired to enhance the contrast of a sequence of images, such as a video or movie sequence, the method may further comprise for each block of the first of the sequence of additional images after the first input image through the last of the sequence of additional input images, the output pixel intensities are defined by averaging with the output pixel intensities of that block in at least the first preceding output image of the sequence.

A look-up table may be compiled based upon the input-output curve. The look-up table contains output values for each of the luma pixel values, and may be used to determine initial output pixel intensities. The luma pixel values in the look-up table may be defined based upon a model of human visual system adaptation to image brightness. The values in the look-up table may be defined based on producing a selectable amount of at least one of enhanced brightness or enhanced contrast for image pixels within a single block.

In certain embodiments, a plurality of look-up tables may be compiled. The plurality of look-up tables may be provided for a variety of purposes and effects pertaining to selectable enhancement of image contrast and/or brightness, which may be selected based upon the imaging application, the objects in the image to be displayed, the type of display that is rendering the image, and other user determined criteria.

In an alternative embodiment of the instant methods, image contrast and overall perceived image quality are improved by using a definition of human vision basis functions. IO curves are developed based on histogram distribution of an image region and its concentration in different perceptual regions that are user defined. The regions may be defined as dark, shadow, mid tone, highlight, and bright.

More specifically, a method of producing an output image with enhanced contrast is provided comprising dividing a digital input image comprised of input image luma pixels into a plurality of blocks; for each of the blocks, computing a histogram of values of luma pixels, the values of luma pixels subdivided into a plurality of histogram bins; for each of the blocks, computing a histogram concentration in each of a plurality of predefined pixel intensity regions; for each of the blocks, for each predefined pixel intensity region that has a histogram concentration that differs in comparison to a predetermined threshold, combining a selected subset of predefined human vision basis functions for that predefined pixel intensity region to define an input-output curve; for each of the blocks, applying the input-output curve to the input pixel intensities to determine initial output pixel intensities; for each of the blocks, defining boundary portions that are contiguous with neighboring blocks; for each of the blocks, averaging the output pixel intensities of each of its boundary portions with the output pixel intensities of the respective contiguous neighboring blocks to define averaged output pixel intensities of each of the boundary portions of each of the blocks; compiling the blocks comprised of pixels with averaged output pixel intensities to produce output image pixel data; and communicating the output image pixel data to an image data receiver.

It is noted that further embodiments of the above method may be as recited previously for the first method embodiment that uses a region based adaptive contrast algorithm.

In accordance with the present invention, a device for enhancing contrast of an image or sequence of images is also provided. The device is comprised of a processor in communication with a non-transitory computer readable medium storing an algorithm communicable to and executable by the processor. The algorithm includes the steps of enhancing as described above and subsequently herein. The device may include an image data receiver, which, in certain embodiments, may be an image display. Alternatively, the image data receiver may be a non-transitory computer readable medium, such as a memory, or a data storage disc, either of which may be portable. The device may further include a data input port in communication with a source of the input image and in communication with the processor.

In certain embodiments, the resulting images (which have enhanced contrast and/or enhanced brightness) produced by the methods of the present disclosure may be further processed to have enhanced sharpness. Such further image processing may include the image processing using the Adaptive Sharpness methods as disclosed in the Applicant's commonly owned copending Application PCT/US 14/68388, Docket No. RTP0002 WO, filed on Dec. 3, 2014 and entitled "ADAPTIVE SHARPENING IN IMAGE PROCESSING AND DISPLAY," the disclosure of which is incorporated herein by reference.

In accordance with the present disclosure, there is also provided a device for providing an image with enhanced contrast. The device is comprised of a processor in communication with a data input port for receiving input data of a digital image, and in communication with a non-transitory computer readable medium storing an algorithm communicable to and executable by the processor. The algorithm may be any one of the adaptive contrast algorithms disclosed herein.

BRIEF DESCRIPTION OF THE DRAWINGS

The present disclosure will be provided with reference to the following drawings, in which like numerals refer to like elements, and in which.

Figure 1:
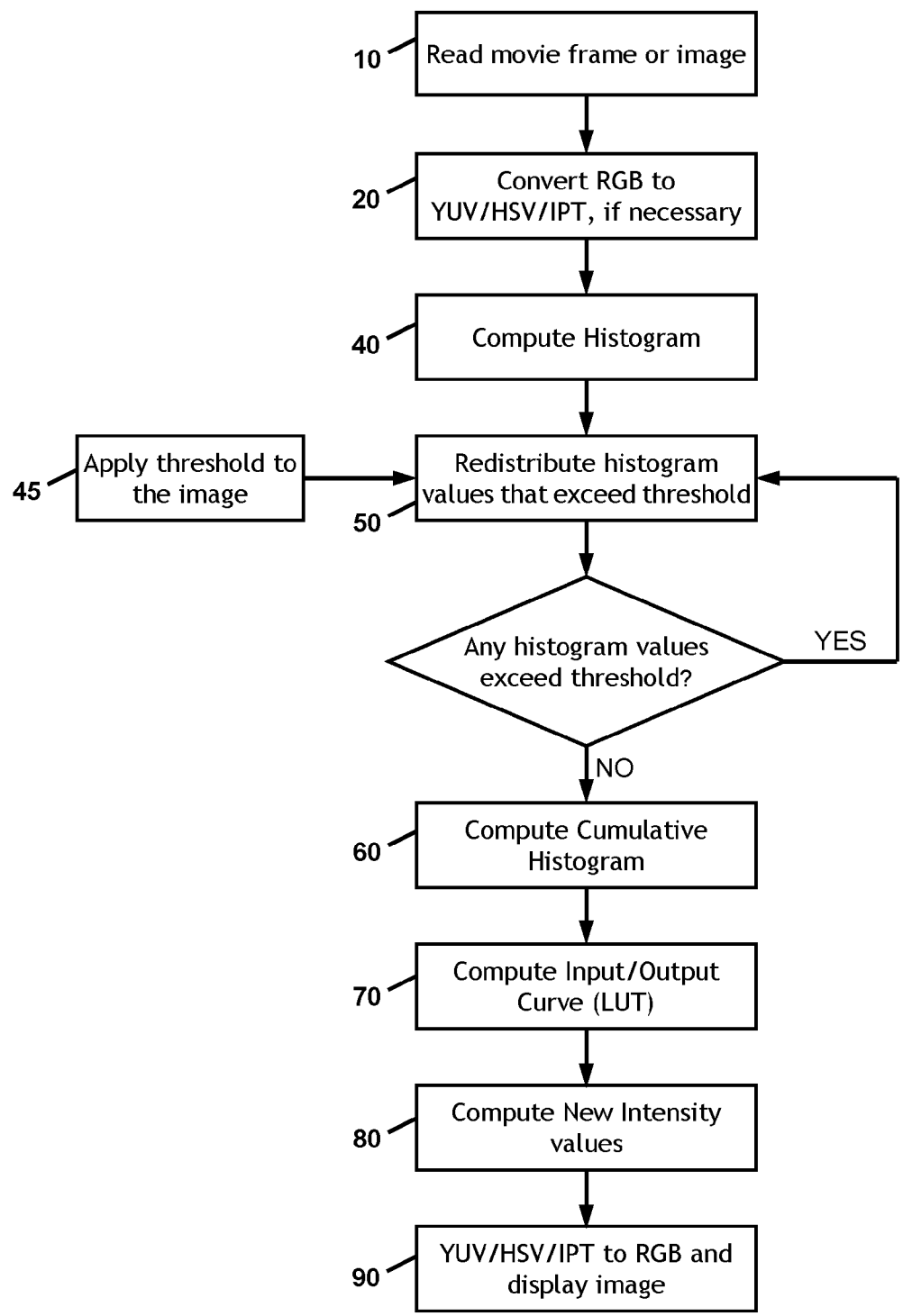
FIG. 1 is a flowchart that depicts steps of a basic algorithm of Contrast Limited Adaptive Histogram Equalization as currently practiced.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements.

In describing the present invention, a variety of terms are used in the description. Standard terminology is widely used in color image processing and display arts. For example, one may refer to the *International Lighting Vocabulary*, Commission Internationale de l'éclairage (CIE), 1987 for definitions of standard terms in the fields of color science and imaging. One may also refer to Billmeyer and Saltzman's *PRINCIPLES OF COLOR TECHNOLOGY*, $3^{RD}$ Ed, Roy S. Berns, John Wiley & Sons, Inc., 2000; and *Color Appearance Models*, Mark D. Fairchild, Wiley-IS&T, Chichester, UK (2005).

In order to fully describe the invention, certain terms as used in the present disclosure are defined as follows:

A "frame" as used herein with reference to an image is meant to indicate all of the content of the image contained within its perimeter. A "movie frame" as used herein refers to an individual image in a reel or strip of movie film, or an individual digital image selected from a sequence of digital images that constitute a "movie" or "video," i.e., a sequence of images that when shown or projected in rapid succession, appear to an observer to blend into an image with a continuous appearance (typically including motion of people and/or objects therein.)

A "frame" based image processing technique is one that is performed on an entire image as a whole.

A "region" based image processing technique is one in which an image frame is subdivided into regions, and then image processing is performed on each of the regions (rather than performing image processing on the entire image as done in frame based image processing).

"Luma" as used herein refers to the brightness in an image, i.e., the "black-and-white" or achromatic portion of an image. Thus the term "luma pixel" refers to the achromatic portion of an image pixel. In image processing and display, luma may be pared with "chrominance," which represents the color information in an image. The combination of luma and chrominance data defines an overall image, and/or the pixels of the image.

As used herein, a "non-transitory computer readable medium" is meant to include all computer readable media, including but not limited to hard disks, compact disks, digital video disks, flash memory, random access memory, read-only memory, cache memory, and register memory; and to not include a transitory propagating signal.

As has been described in the preceding SUMMARY, the methods of the present disclosure may be characterized as being under one of two broad methods: Region Based Adaptive Contrast, or Adaptive Contrast Using Basis Functions. These methods will now be described in detail.

Region Based Adaptive Contrast

Figure 2:
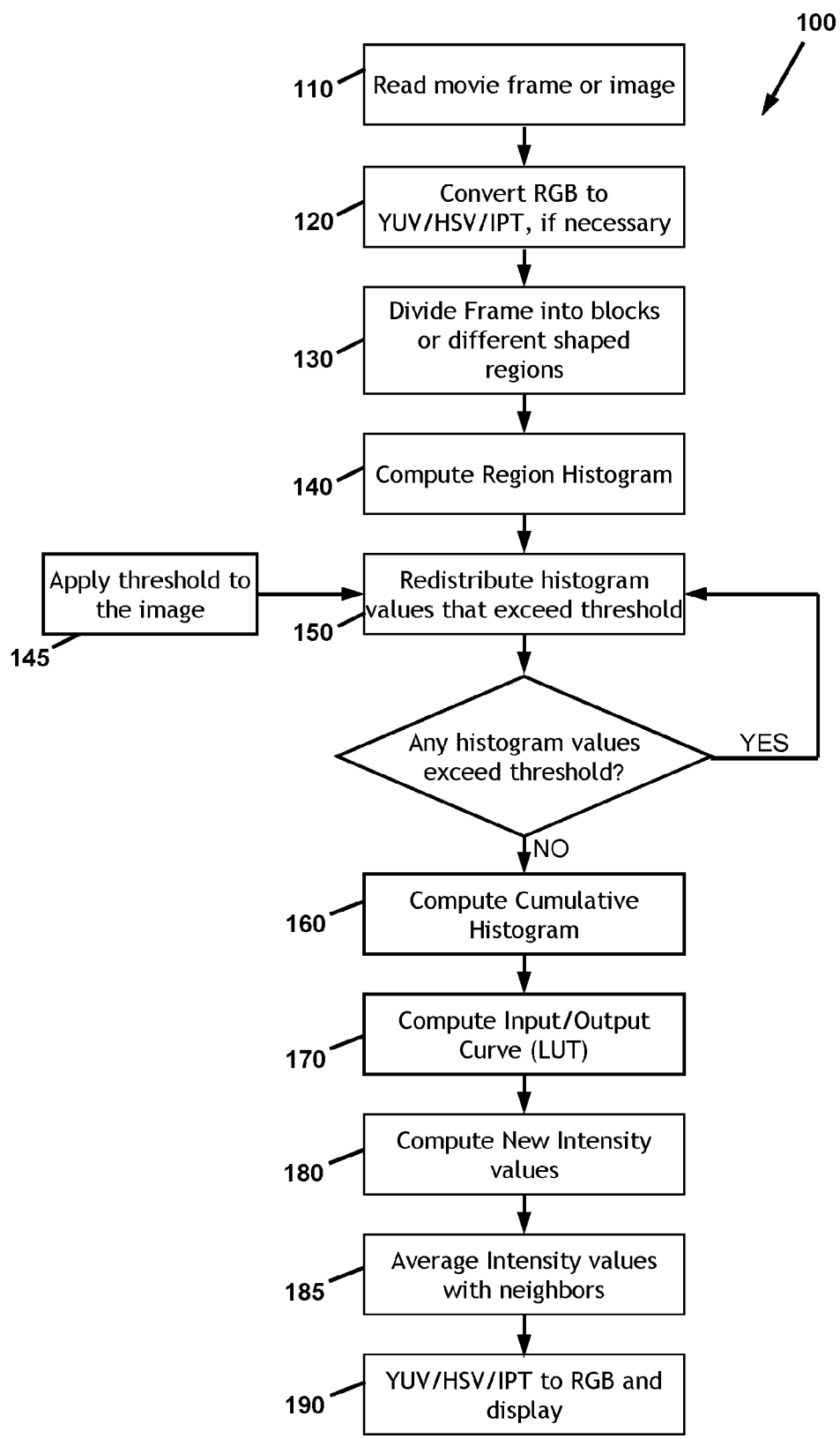
FIG. 2 is a flowchart that depicts a method of performing adaptive contrast enhancement on an image or sequence of images using a new algorithm of Contrast Limited Adaptive Histogram Equalization in accordance with the present disclosure.

Turning first to FIG. 2, a method of performing adaptive contrast enhancement in an image or sequence of images is depicted. Method 100 uses a new region-based algorithm of Contrast Limited Adaptive Histogram Equalization, which will now be described.

In method 100, a movie frame, video image, or other input image is read in step 110, and image pixels defined by RGB tristimulus values may be converted to values of another color space in step 120, as described previously with reference to FIG. 1. Method 100 then departs significantly from the method and algorithm of FIG. 1 in subsequent steps.

Figure 3:
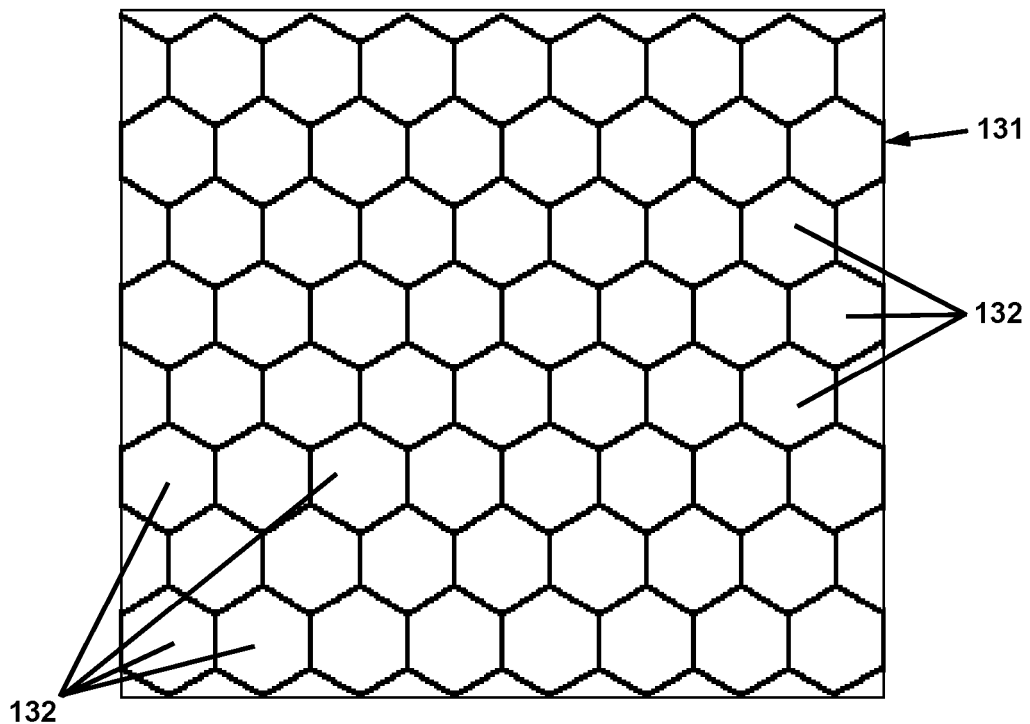
FIG. 3 is a schematic illustration of an image frame that is divided into a plurality of hexagonal regions in accordance with a method of the present disclosure.

In step 130, the image frame is divided into regions, which are preferably equal in size and have the same shape. In certain embodiments, the regions (also referred to herein as blocks) may be rectangular, thus providing the most efficient structure for subsequent computations that are to be performed. In other embodiments, the regions may have other shapes. For example, FIG. 3 depicts an image frame 131 that is divided into a "honeycomb," i.e., a plurality of hexagonal regions 132. The size and shape of the regions may be specified as parameters, which may be input to the computer or other processor that executes the algorithm.

In step 140, for each region or block, the histogram $h_i[n]$ of luma pixels is computed. The X-axis of a histogram, i.e. the histogram "bin" values are the values of the luma pixels. For an eight bit grey scale, the range of luma pixel values will be from 0-255. Accordingly, in certain embodiments of method 100, 256 may be the maximum number of bins. In other embodiments, a smaller number of bins may be used for more efficient computation, and then the resulting luma pixel values may be scaled (interpolated) back to 256 values at the end of step 140.

In step 145, for each region or block, a predetermined threshold is applied, and in step 150, all the histogram values that exceed the threshold are uniformly redistributed among the remainder of the histogram bins. As described previously, if any histogram values of the revised distribution exceed the threshold, then those values are redistributed among the remainder of the histogram bins.

If no histogram values exceed the threshold, then in step 160, for each region or block, the cumulative histogram c(n) is computed, wherein:

$$c(n)=h(n)+h(n-1).$$

Additionally, in step 170, an IO-curve q(n) is computed by scaling the cumulative histogram so that c(255)=255. Additionally, the IO curve may be computed by scaling the individual histograms such that h(255)=255 to produce individual IO curves in the 3×3 region of blocks, and then averaging the individual IO curves to arrive at the final IO curve for that particular block. In either case, the final IO-curve thus defines a Look-Up Table (LUT), with a range of 256 luma pixel values (where n=255), and for each value in the range, a corresponding cumulative sum value up to a maximum of 255 for n=255.

In certain embodiments, the luma pixel values in the look-up table may be defined based upon a model of human visual system adaptation to image brightness. The values in the look-up table may be defined based on producing a selectable amount of at least one of enhanced brightness or enhanced contrast for image pixels within a single block.

In certain embodiments, a plurality of look-up tables may be compiled. The plurality of look-up tables may be provided for a variety of purposes and effects pertaining to selectable enhancement of image contrast and/or brightness. The values in a look-up table and the resulting table that is selected may be based upon the imaging application, the objects in the image to be displayed, and/or the type of display that is rendering the image.

For example, the different look-up tables may be defined for different image or video data types including but not limited to games, movies, personal photos, military intelligence image or video data, medical modality image or video data, and commercial image or video data for exploration or industrial analysis. Additionally, for a given input image or sequence of images, different look-up tables may be chosen for each block using additional information about the type of data in the block or region, including but not limited to information about whether the block includes faces or skin, text, graphics, uniform data, or structured/patterned data such as trees or grass. Additionally, the different look-up tables may be defined for different displays that are to render the image(s), including but not limited to televisions, computer monitors or computer screens, smartphones, tablets, and digital signs. Additionally, the different look-up tables may be defined based upon information about the importance of a particular image or image block to the user/viewer of the output image.

In step 180, for each block, the output intensity is computed by the application of the LUT or IO curve to the input pixel intensity to give the output pixel intensity. From this point forward, if the algorithm of the prior art (as described previously with reference to FIG. 1) were followed, the next step would simply be to convert the pixel values in YUV, HSV, or IPT (if the pixels are defined in one of those color spaces) to RGB tristimulus pixel values, and to display the image defined by the RGB values. However, there is a problem in proceeding in this manner according to the algorithm of the prior art. The Applicant's new method and algorithm for performing adaptive contrast enhancement solves this problem, as will now be described.

First, the problem is that in an image frame that is divided into blocks, there could be sharp changes from one block to the next; thus if the pixel values are immediately converted and the image is displayed according to the prior art practice, then the image will contain "blocky" artifacts. To an observer of the image, such blocky artifacts appear as sharp changes in intensities at the block boundaries, and result in the observer to perceive the image as being of lesser quality.

In the method and algorithm of the present disclosure, this problem is solved in step 185 by averaging the intensity over the blocks, and in particular, around the boundary portions of the blocks. This is best understood with reference to FIG. 4, which depicts an exemplary image frame 133 divided into a 3×4 array of 12 blocks 134. The block boundaries are indicated by solid lines. Boundary portions within each block that need "special handling" are bounded by the solid boundary lines and the interior dashed lines, which thus define the portions of the blocks on their perimeters. "Special handling" as used in this context means performing further analysis and computation so as to modify the image data in a manner that prevents blocky artifacts in an output image.

For any given block, the number of distinct boundary portions that need special handling depends on the position of the block within the frame 133. For a block in a corner of the frame 133, such as block 135, there are three boundary portions 135A, 135B, and 135C that need special handling. For a block along an edge of the frame 133, such as block 136, there are five boundary portions 136A-136E that need special handling. In an internal block, such as block or region 137, there are eight distinct boundary portions 137A-137H that need special handling. Four of these are corner boundary portions 137A, 137C, 137E, and 137G (denoted by cross-hatching). The remaining four are center boundary portions 137B, 137D, 137F, and 137H (denoted by dense large dots).

For each of the four center boundary portions 137B, 137D, 137F, and 137H, all of the pixels contained therein require two histograms to compute the output pixel value: one for the block 137 containing the center boundary portion, and the other for the block adjacent to the center boundary portion.

In like manner, for each of the four corner boundary portions 137A, 137C, 137E, and 137G, each pixel contained therein requires four histograms to compute the output pixel: one for the block 137 containing the corner boundary portion, and three others for the blocks that neighbor that corner boundary portion. Pixels contained in the center portion 137 of block 137 (denoted by low density small dots) are simply replaced by the corresponding value stored in the IO-curve for the given block.

Figure 4:
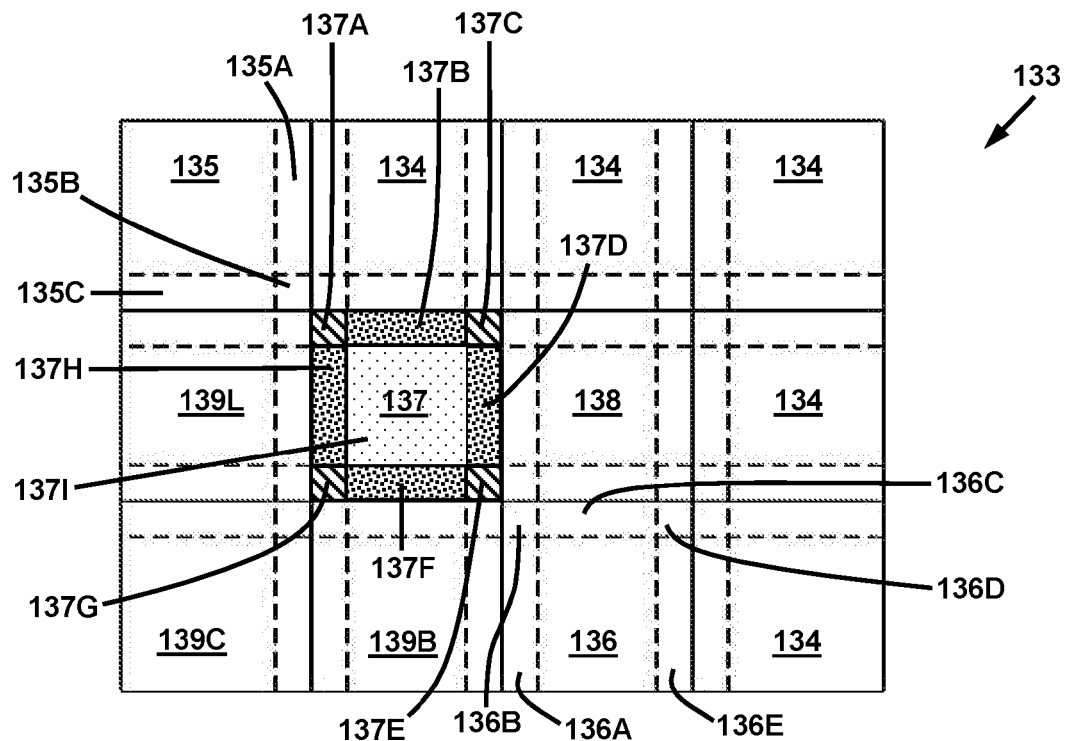
FIG. 4 is schematic illustration of an image frame that is divided into a 3×4 array of 12 blocks, each of the blocks including certain boundary portions.

As an example, consider the center boundary portion 137H on the left of block 137 in FIG. 4. For a given pixel $p_{in}(x,y)$ in the input frame, the output pixel $p_{out}(x,y)$, at location (x,y) is computed by linearly interpolating between the two values given by the histograms of the two blocks 137 and 139L. Specifically:

$$p_{out}(x,y) = \alpha_h q_i[p_{in}(x,y)] + (1-\alpha_h) q_{i-1}[p_{in}(x,y)],$$

where, $q_i$ represents the IO-curve for the highlighted block 137, and $q_{i-1}$ represents the IO-curve for the block 139L on the left of the highlighted block. The coefficient $\alpha_h$ is normally a linear function of the horizontal position x of the given pixel. (It is not necessary that $\alpha_h$ is linear. It could be non-linear, or represent any other function such as raised cosine, exponential etc.)

In like manner, for a given pixel $p_{in}(x,y)$, at location (x,y) in the bottom-left corner boundary portion 137G, the output pixel $p_{out}(x,y)$ is computed by interpolating the four pixels obtained from the four neighboring histograms:

$$p^{out}(x,y) = \alpha_v q_i[p_{in}(x,y)] + (1-\alpha_h) q_{i-1}[p_{in}(x,y)] + (1-\alpha_v)[\alpha_h q_{i+4}[p_{in}(x,y)]] + (1-\alpha_h) q_{i+3}[p_{in}(x,y)].$$

where, $q_i$ represents the IO-curve for block 137, $q_{i-1}$ represents the IO-curve for the block 139L on the left of the block 137, $q_{i+4}$ represents the IO-curve for the block 139B on the bottom of the highlighted block 137, and $q_{i+3}$ represents the IO-curve for the corner block 139C on the bottom-left of the highlighted block 137. The coefficients $\alpha_h$ and $\alpha_v$ depend on the respective horizontal and vertical coordinates of the input pixel $p_{in}(x,y)$.

Referring again to FIG. 2, after the intensity values of neighboring blocks have been averaged as described above, in step 190, the pixel values in YUV, HS, or CieIPT are converted to RGB tristimulus pixel values. An output image defined by these RGB values may be displayed, or the pixel values of the output image may be used for other image processing purposes.

In embodiments in which a color transformation of the digital input image from RGB color space to CieIPT color space is performed, the input pixel visual brightness or luminance values are determined using the Cie IPT visual color standard where equal adaptive visual brightness values, I, have the same brightness and same color visually for different PT values. In that manner, the look-up table processing of input image or video I values does not change pixel color or produce image or video artifacts and loss of detail, which has been found to occur with other standard color transformations, including but not limited to CieL*a*b*, CieLuv, and HSV.

IO Curves Averaging in Region Based Adaptive Contrast

In some circumstances, despite the performing of averaging around the blocks as described above, when the transition in IO curves from one block to another adjacent block is sharp, such that adjacent boundary portions have sharp changes in intensity from dark to bright or vice versa, then image artifacts may be produced around the transition boundaries. Additionally, other artifacts, such as halos around edges may appear depending upon the image complexity. This will cause an observer of the output image to perceive it as being of low quality, which is undesirable.

Figure 5:
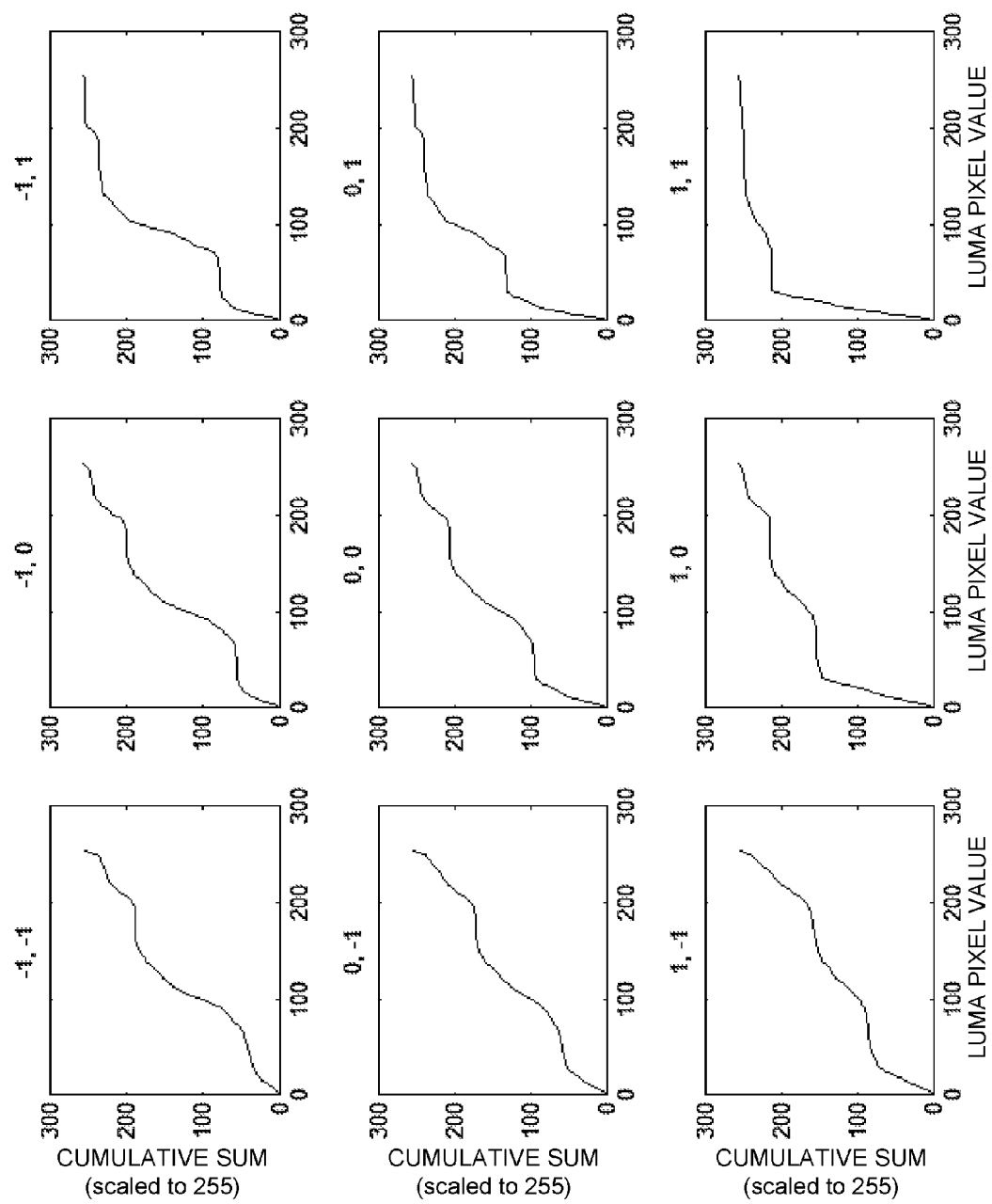
FIG. 5 is an illustration of an exemplary grid of IO curves that demonstrate "neighborhood averaging" of IO curves.

To solve the problem of artifacts being produced due to the sharp changes in the IO curves, the method 100 may include performing "neighborhood averaging" of the IO curves. One example of such neighborhood averaging is shown in FIG. 5, which depicts a 3×3 grid of IO curves. The center block, (0, 0), is the block of interest. These exemplary curves were generated for an image with a block size of 32×32 pixels. As can be seen from a comparison of the various nine IO curves, it is clear that the IO curves can change significantly from one block to another.

In one embodiment, the neighborhood averaging is performed by simple averaging of neighboring blocks. In such an embodiment, the center IO curve, (0,0), is recomputed as a simple average of the nine blocks. In the neighborhood averaging of boundary blocks, fewer blocks are used in such averaging. For example, the top-right block (−1,1) will only have an average of the four blocks (−1,0), (0,0), (0,1), and (−1,1). In like manner, the neighborhood averaging for boundary block (1,0) will be the average of that block and the five blocks that are proximate to it.

It is to be understood that simple averaging is only one way to compute a center block IO curve. In other embodiments, a center block IO curve may be computed from a weighted average of the surrounding IO curves of the neighboring blocks. In its most general form, this principle is expressed as follows:

$$q'_{(0,0)} + w_1 q_{(-1,-1)} + w_2 q_{(-1,0)} w_3 q_{(-1,1)} + w_4 q_{(0,-1)} + w_5 q_{(0,0)} + w_6 q_{(0,1)} + w_7 q_{(1,-1)} + w_8 q_{(1,0)} + w_9 q_{(1,1)}.$$

where, q' is the resultant IO curves, and $w_1, \ldots, w_9$ are the weights. For simple averaging, all of the weights $w_1, \ldots, w_9 = 1/9$. For a better low pass filtering of the IO curves, the weights may be set proportional to their respective distances from the center IO curve. Other schemes for defining the weights are contemplated.

It is noted that, as a practical matter, the above schemes for defining weights requires storage of future IO curves in the memory of a processor, or in another suitable non-transitory storage medium. This is not an issue in an implementation where sufficient memory is available. However, for in line processing, i.e., performing the computation entirely within the block without using external memory, or where future memory is not required, then the following averaging scheme may be used:

$$q'_{(0,0)} + w_1 q_{(-1,-1)} + w_2 q_{(-1,0)} + w_3 q_{(0,-1)} + w_4 q_{(0,0)}.$$

In the above scheme, the neighboring blocks (−1,−1), (−1,0), and (0,−1) that are chosen are either above the current block or before it in the processing chain. Accordingly, no holding/saving of future blocks is required. The four weights $w_1$-$w_4$ may be ¼, or they may be based on a suitable low pass function. Blocks that are boundary blocks will need "special processing," i.e., the selection of blocks for weights will be from a lesser number of choices as described previously.

It is important to note that for any given block, when a new IO curve is computed using neighborhood averaging, that new computed IO curve, q', does not replace the original IO curve, q in a location in the memory of the processor that is in use. Instead, a separate location in memory is used to store q', because q will be needed in the future for computing other IO curves.

Handling Small Block Sizes in Region Based Adaptive Contrast

In performing the method 100 of Region Based Adaptive Contrast, prior to performing step 130, a determination must be made as to the size of the blocks into which the image frame will be divided. Accordingly, several trade-offs are to be considered when choosing a block size:

1) If a relatively large block size is chosen, the blocks will cover large areas. This may not be optimal for adapting to the details in the particular image.

2) Additionally, choosing a large block size requires large memory storage, particularly considering that IO curve neighborhood averaging requires storing IO curves for past and future blocks.

3) If a relatively small block size is chosen, then it may adapt such that very fine details in the image may be perceived by an observer to be noise. In other words, in a very small region, certain details may be undesirably enhanced.

4) A relatively smaller block size, for example, a size of 32×32, may not have enough pixels to create a smooth histogram that is representative of the underlying image intensity changes, or that has enough entries per "bin." (This may be overcome by making a histogram with fewer bins than 256 and then interpolating the histogram to 256 bins.)

Through experimentation and analysis, the Applicants have determined that a block size upper limit wherein the image is divided into an array of 4×4 blocks is sufficient to attain a satisfactory trade-off.

In circumstances in which a small block size has been chosen, and then it is determined that sufficient pixels are not present in the blocks (as described in tradeoff number 4) above), then the following pseudocode may be used to create a histogram:

```
If Block Size is less than 128
    Create Histogram of 128 bins
    Interpolate Histogram with a factor 2 OR Repeat bin values twice
elseif Block Size is less than 64
    Create Histogram of 32 bins
    Interpolate Histogram with a factor 8 or Repeat bin values 8 times
elseif Block Size is less than 32
    Create Histogram of 16 bins
    Interpolate Histogram with a factor 16 OR Repeat bin values 16 times
endif
```

It is noted that this scheme may be used to save computation time as well, and is not limited to use only when the block size is small.

Managing Threshold in Region Based Adaptive Contrast

Choosing an optimal threshold value is an important consideration in obtaining superior results in method 100 and the underlying algorithm. The choice of threshold value also entails tradeoffs. If the threshold value is chosen too high, then the resulting IO curve for a given block will be highly non-linear and will result in extreme contrast for some images. If the threshold value is chosen too low, then it will result in a linear IO curve (straight line), which in turn will result in no change in the pixel intensities.

There are three important parameters that should be considered in determining the threshold value: i) the maximum value of the block histogram; ii) the block size; and, iii) the standard deviation of the pixel intensities. In general, the threshold value needs to be set to a value that is less than the maximum value but higher than the average bin value, which is determined from the block size and the number of bins using an empirical formula. Given the block size and the number of bins of histogram, the average number of pixels in a bin is known; the maximum number for the threshold value can be computed from that value. Additionally, the underlying premise of the contrast improvement algorithm is to widen the concentration of the pixel intensities or, in other words, increase the standard deviation.

Considering all of the above factors, in certain embodiments, the threshold value $Th_{B(x, y)}$ may be set for a block B(x,y) according to the following pseudocode:

```
Th_{B(x, y)} = Ave_{B(x, y)} + k1 * (max_{B(x, y)} − Ave_{B(x, y)})
If Th_{B(x, y)} > k2*max_{B(x, y)}
    Th_{B(x, y)} = k2*max_{B(x, y)}
elseif Th_{B(x, y)} < k3*Ave_{B(x, y)}
    Th_{B(x, y)} = k3*Ave_{B(x, y)}
endif
``` where k1, k2, and k3 are constants; k1 is dependent upon the standard deviation; k2 and k3 are selectable and are usually between [0, 1]; $max_{B(x, y)}$ is the maximum value of the histogram of block B(x, y); and $Ave_{B(x, y)}$ is the mean histogram value per bin.

Depending upon the image(s) being processed, the above algorithm may be computationally intensive, especially for software based implementations. In such circumstances, a simpler version of the above algorithm may be implemented according to the following pseudocode:

```
Th_{B(x, y)} = Ave_{B(x, y)} + k1 * (max_{B(x, y)} − Ave_{B(x, y)})
If Th_{B(x, y)} > k2*max_{B(x, y)}
    Th_{B(x, y)} = k3*Ave_{B(x, y)}
endif
```

Non-Uniform Threshold in Region Based Adaptive Contrast

In practicing method 100, it is not required that the threshold value that is used be a constant value. The threshold value may be non-uniform, i.e., it may vary over the range of values that define the histogram bins. This is best understood with reference to FIGS. 6-8.

Figure 6:
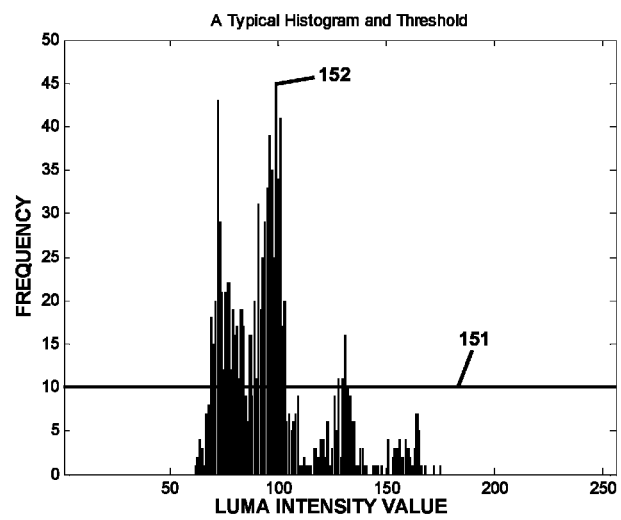
FIG. 6 is a graphical illustration of a first thresholding scheme in which the threshold value is a constant across the full range of histogram bins.

Referring first to FIG. 6, a typical thresholding scheme is depicted in which the threshold value 151 is a constant. The threshold 151 is at slightly above the mean of the histogram and below the maximum value 152. The histogram is clipped at that value 151, and the values above the threshold value 151 are distributed evenly among all the bins below the threshold 151. The IO curve is then defined as the cumulative sum or the cumulative distribution of the histogram. (Some exemplary IO curves defined in this manner are shown in the previously described FIG. 5.)

One limitation of CLAHE results from the practice of uniform thresholding. As can be seen, a uniform distribution of values above threshold to the bins that contain zero values will result in linear sections of the IO curve. It is desirable and sometimes necessary that certain sections of an IO curve have more emphasis than others. For instance, a higher emphasis of luma pixel intensities that are around a value of 60 is beneficial in rendering more details for objects that are in shadows (or otherwise less brightly lit than other objects in the image).

To address this problem or limitation, the threshold value may be made variable and dependent on the luma pixel intensity values. In certain embodiments, the threshold value may be made adjustable according to image output requirements or the type of display that is used to present the output image.

Figure 7:
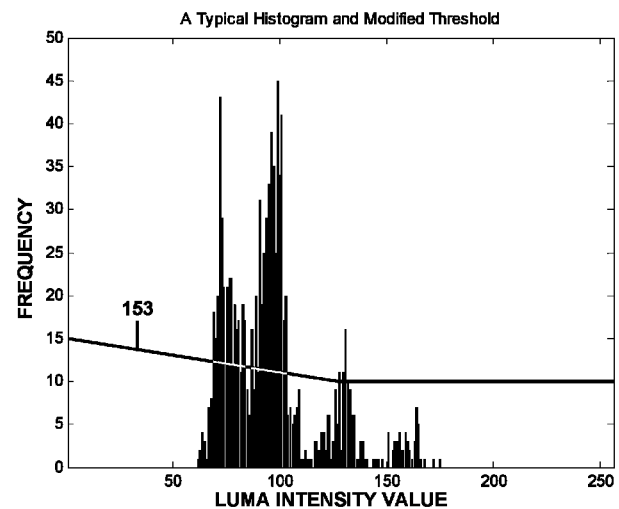
FIG. 7 is a graphical illustration of a second thresholding scheme in which the threshold value is variable over a portion of the range of luma intensity values.
Figure 8:
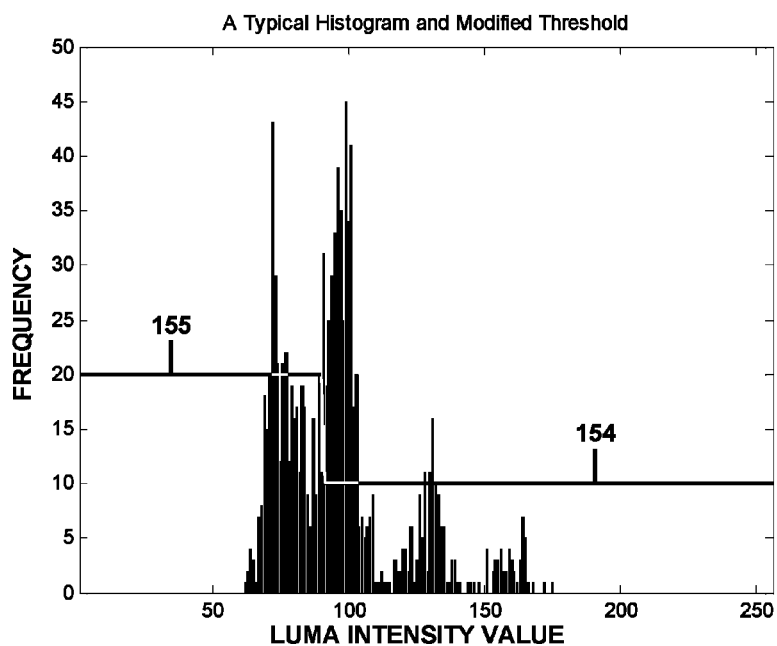
FIG. 8 is a graphical illustration of a third thresholding scheme in which the threshold value is a first value over a first portion of the range of luma intensity values, and is a second value over a second portion of the range of luma intensity values.

FIGS. 7 and 8 depict two thresholding schemes in which the threshold value varies over the range of luma intensity values. These schemes may be beneficial in enhancing the dark regions of certain images.

FIG. 7 depicts a thresholding scheme having a linearly decreasing threshold (line 153) on intensities, which when integrated, will result in a non-linear increasing of the dark or the shadow regions of an image. FIG. 8 depicts a thresholding scheme having a simple doubling of a base threshold value 154 to an elevated value 155 in the low intensity regions, which will result in a linear IO curve but with higher slope in the low intensity regions. It is to be understood that these schemes are to be considered as exemplary, and are not to be construed as limiting. Different variations of the general variable threshold concept may be applied in any image region and also to counter any display specific transfer function.

Uniform Intensity Areas in Region Based Adaptive Contrast

For uniform intensity areas such as clouds, sky, or dark background, the cumulative intensity of the histogram will result in significant stretching of the intensity values if the threshold is set high. In other words, an observer of the image will perceive increased contrast that will look unnatural. For clouds or sky that are characterized by uniform intensity areas, the histogram will be narrow, meaning that pixel intensities will be in a narrow range. For optimum perceived image quality, that range needs to stay narrow. If the threshold is set too high, "contrast stretch" will distribute them over the entire range of 0-255, causing the unnatural appearing increased contrast. Furthermore, if there is noise present in a uniform intensity area, the noise will become very noticeable by an observer of the image, who will then perceive the image to be of low quality. Additionally, objects that are surrounded by a uniform background will have a halo around them under these circumstances. Thus it is desirable that both of these artifacts be avoided.

In the method and algorithms of the present disclosure, this problem may be solved in three different ways. Additionally, it is noted that these different ways are not mutually exclusive. In certain embodiments, various combinations of two of the three ways, or all three of the ways may be used at the same time.

It is also noted that for the image regions with uniform intensity, the histogram is very narrow or highly concentrated within a few intensity values.

1) Given the region size, a threshold is set to a small percentage (on the order of a few percent) of the maximum value of the histogram. For example, the threshold may be set to 0.5% of the maximum. This threshold value is added to all the bins in the histogram. The effect of setting this minimum value for each histogram bin is that there will be intensity distribution in each bin and each bin will contribute to the final IO curve, thus limiting the effect of uniform region stretching.

2) It is also required that for an IO curve, each value is within a certain percent of the previous one and it will never be lower than the previous value. In one case, the value at bin n may be at least 80% of the value at n+1. This controls the slope of the IO curve and thus noise will not be amplified.

3) For bins that contribute little to the histogram, their values can be set to zero. Such bins are normally associated with noise and thus will only affect the final image output in a negative way. A threshold based on a maximum, as done in 1) above may be used.

Brightness Control in Region Based Adaptive Contrast

Figure 9:
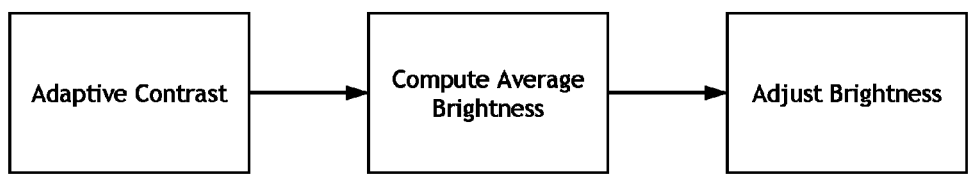
FIG. 9 is a flowchart depicting a method to adjust brightness in an image, in addition to enhancing contrast in an image.

In many cases in image processing to enhance contrast, further adjustment of brightness may be needed. The contrast enhancement alone may not be sufficient to produce an image that is perceived to be of the highest quality. Based upon the average intensity level of the output intensity, the brightness level of an image, or of blocks in an image may be increased. A simple flow chart that depicts possible steps to adjust brightness is shown in FIG. 9.

In certain embodiments, brightness adjustment may entail a simple "lifting" of the IO curve. In other embodiments, there is provided an "intelligent lifting" of the levels of the IO curve based upon the requirements of the display that is used to present the output image.

In such embodiments, one can use a mathematical expression to compute average brightness and to derive a curve such as one based on exponentials, sinusoids, logarithm, or polynomials. The adjustment could be heuristic as well.

Figure 10:
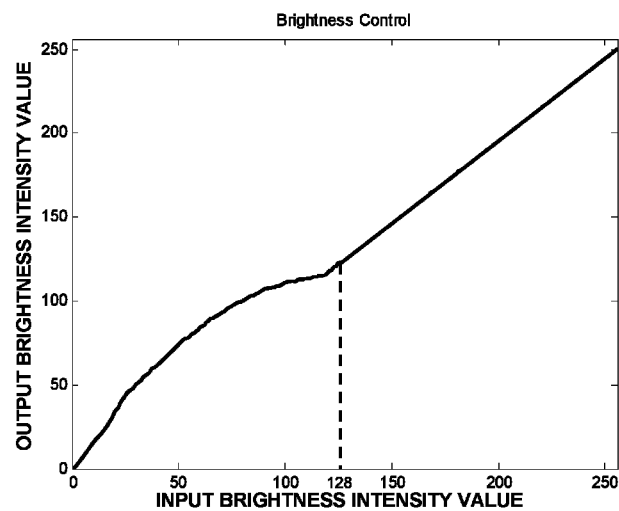
FIG. 10 is a graphical illustration of brightness adjustment that may be performed in addition to the instant method of adaptive contrast.

Average brightness may be region based as well. For instance, if the average brightness level in shadow regions is too low, then only those pixels may be selected for adjustment of brightness. One example is given in FIG. 10 where the input intensity values less than 128 are enhanced, and the values greater than 128 remain unchanged.

Advantageously, the enhancement of image brightness as disclosed herein may be used not only to make images brighter, but also to achieve power savings in the operation of a display device. The power savings can thus result in extended battery life of a battery powered device, and/or longer intervals between recharging of the batteries of a portable or mobile device, such as a laptop computer, a tablet computer, a smart phone, a GPS device, as well as many other electronic devices that present information to a user via an image display. In general, the above adaptive brightness methods may be used to increase the perceived brightness of an image, and then, rather than display the image at the higher perceived brightness, the image may be displayed at a lesser brightness by decreasing the power to the display. The image with lesser than the maximum brightness is still perceived as satisfactory to a view of the display.

This is best understood with reference to FIGS. 14-17, which depict experimental results obtained via testing of a Panasonic Toughbook® laptop portable computer. Such portable computers are used in extreme environmental conditions including military operations; thus display reliability and battery lifetime are critical attributes. However the results depicted in FIGS. 14-17 are applicable to any image displays.

Figure 14:
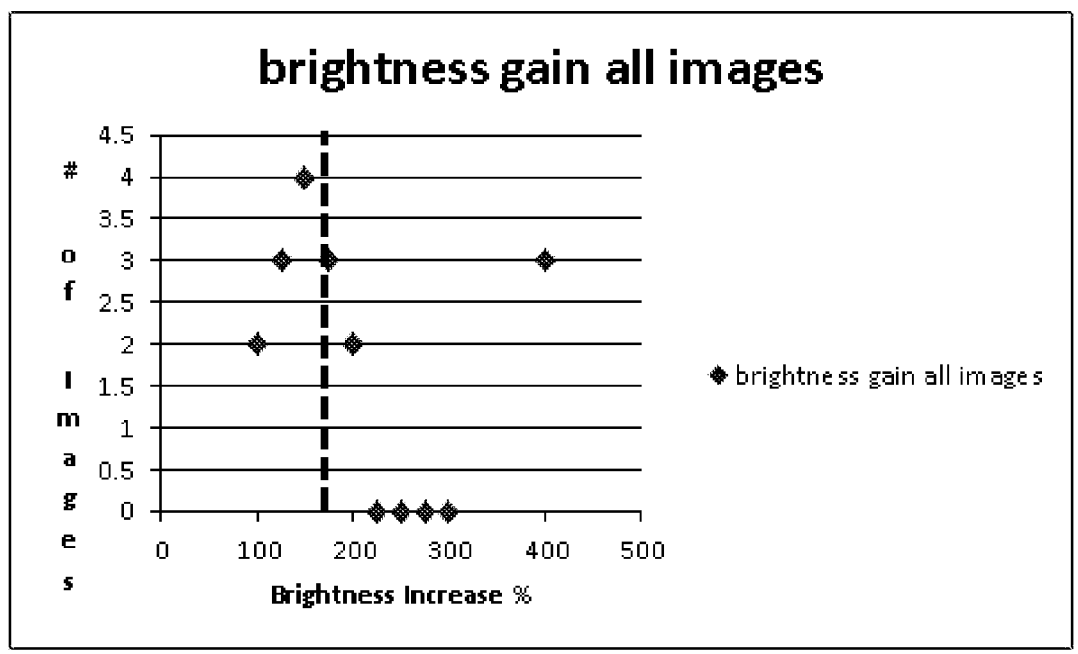
FIGS. 14-17 depict a series of graphs that demonstrate certain brightness gain, power savings, and display lifetime advantages of the adaptive brightness methods of the present invention.

FIG. 14 depicts the brightness increase for ten output test images that were portraits, outdoor scenes, graphics and a text page. The brightness increase is different for each image based on image data and how dark the respective input image was. The average brightness image, indicated by the vertical dotted line, was 185% or 1.85 times brighter than the original image, i.e. nearly double the input image brightness.

Figure 15:
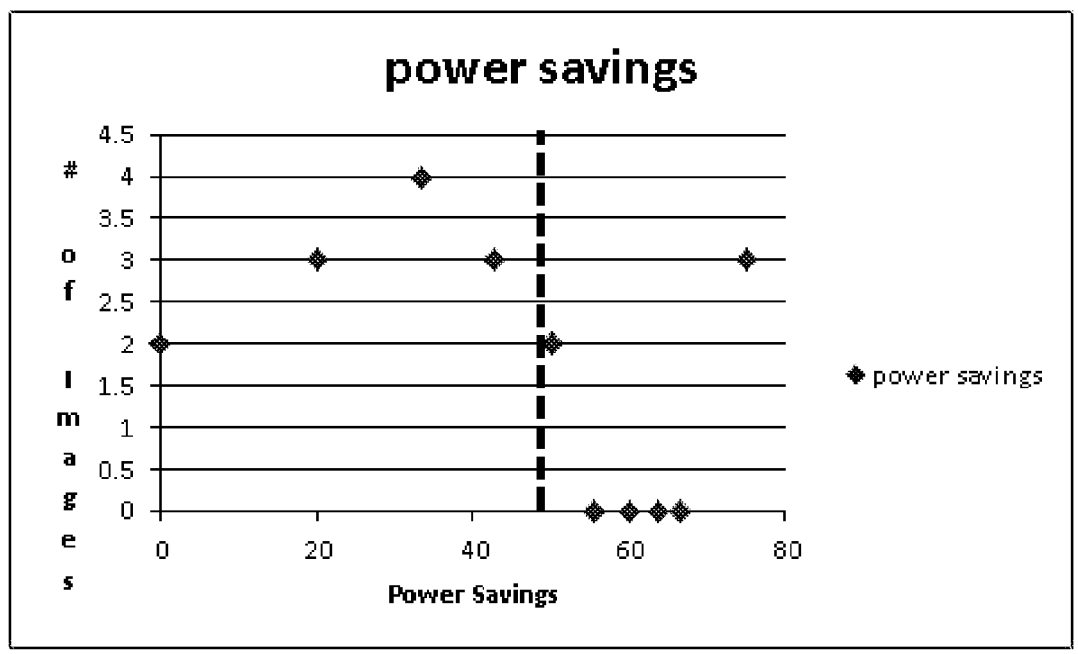

FIG. 15 depicts the power savings for each of the ten images that resulted by reducing the display power such that the output image brightness was reduced back to the brightness of the input image. The average power savings, indicated by the vertical dotted line, was 46%. In general, if an image brightness increase of 100% or 2× is attained, then the display power can be reduced by 50% or half. Thus the demonstrated 46% power savings indicates that the average brightness increase was just under 100%, i.e., 2×.

Figure 16:
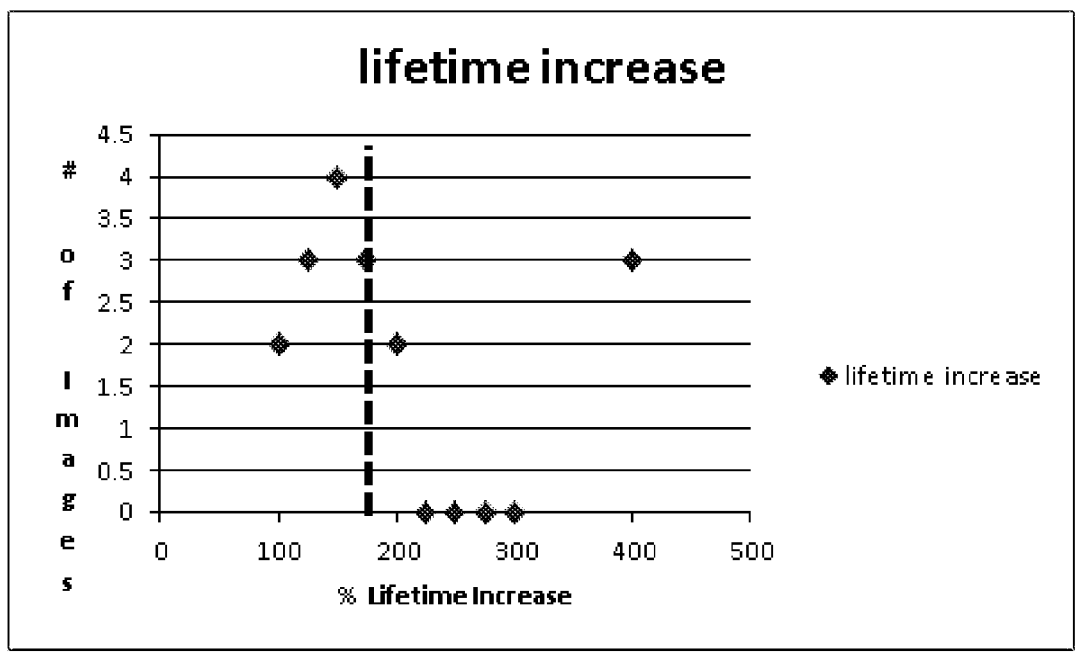

FIG. 16 depicts the battery lifetime increase that resulted from the power savings of FIG. 15, i.e., before the laptop computer consumed all available battery power. Basically, the gain in lifetime is inversely proportional to the power decrease; this 50% power decrease provides a 2× increase in lifetime. Thus the data of FIG. 14 and FIG. 16 mirror each other.

Figure 17:
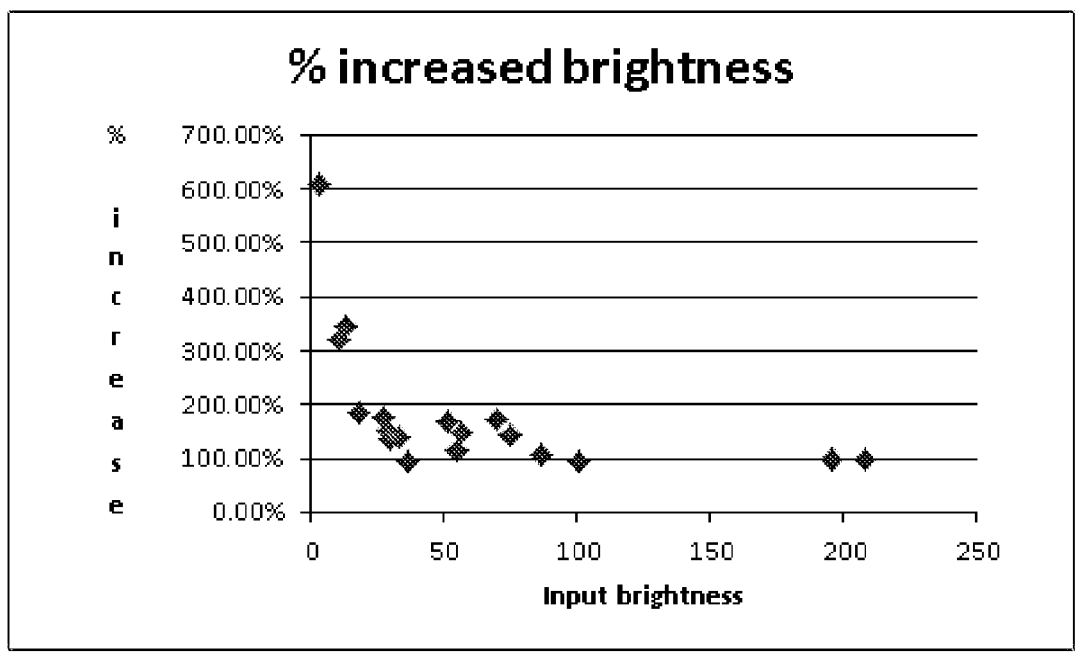

FIG. 17 is plot of brightness increase for each pixel in the ten images showing that brightness of the darker input pixels is increased more, with the curve being highest at the low input brightness. This illustrates that the shadow regions in an image get the most increase in brightness, which is exactly the desired result in order to attain better perceived image quality by an observer of the image.

A Variation on Intensity Distribution in Region Based Adaptive Contrast

As described previously with regard to the basic CLAHE algorithm depicted in FIG. 1, the intensity values above a certain threshold are clipped and distributed over all the histogram bins. In an alternative embodiment of the instant adaptive contrast method, the Applicants have found that this is not necessary. Instead, the instant method may further comprise clipping the values at a certain threshold and producing a histogram, without intensity value distribution, and developing a cumulative histogram or IO curve from it. This simplifies the algorithms and also controls many artifacts, as the user has the total control over how the modified histogram needs to appear.

Alternative Embodiments of Region Based Adaptive Contrast

Figure 13:
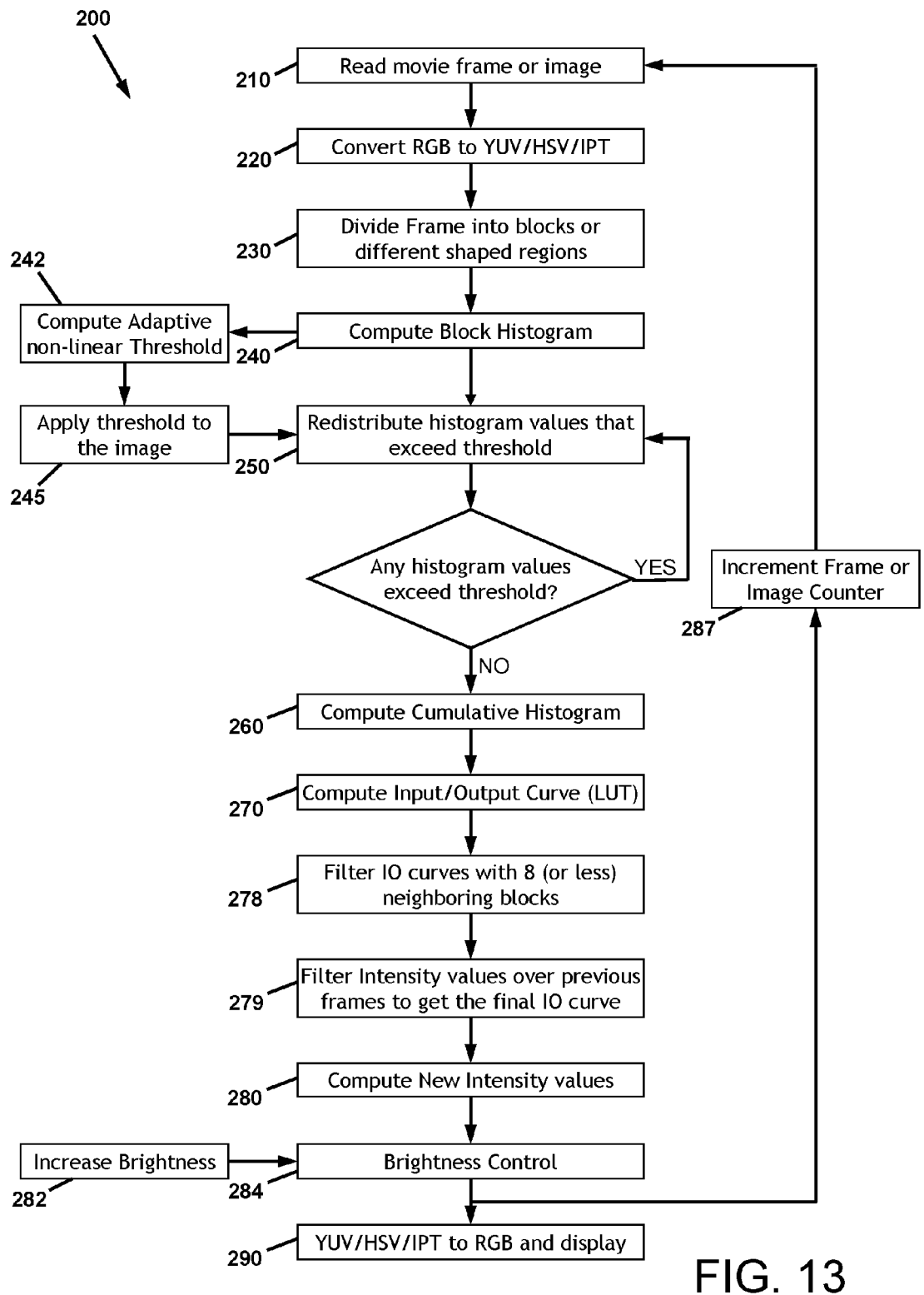
FIG. 13 is a flowchart depicting an alternative method of performing adaptive contrast enhancement on an image or sequence of images using Contrast Limited Adaptive Histogram Equalization.

FIG. 13 is a flowchart depicting an alternative method of performing region based adaptive contrast enhancement on an image or sequence of images using Contrast Limited Adaptive Histogram Equalization. In the method 200 of FIG. 13, steps 210-240, 245, 260, 270, 280, and 290 are essentially the same as steps 110-140, 145, 160, 170, 180, and 190 of method 100 of FIG. 2, and will thus not be described again in detail. In step 242 of method 200, an adaptive threshold is computed. The adaptive threshold may be non-linear. Additionally, the adaptive threshold may be as described previously for non-uniform thresholds with reference to FIGS. 6-8. In step 245, the threshold is applied to the image as described previously.

Moving ahead in method 200 of FIG. 13, after computing the Input/Output curve in step 270, for each of the blocks, in step 278 the I/O curve of that block is "filtered" with its neighbors. i.e., neighborhood averaging is performed as described previously. The filtering may be performed with eight neighboring blocks, or certain combinations of four neighboring blocks as described previously.

In step 279, for each block, the intensity values may also be "filtered," i.e. averaged with the intensity values for the same block of at least one preceding image frame. For example, for block X of image frame N, the final new intensity value obtained in step 280 may be an average of the intensity values of image frame N, and the intensity values of block X in image frame N–1. The averaging may be done over more than one preceding image frame, i.e., an average may be taken over additional preceding image frames, N–2, N–3, N–4, etc. Alternatively, the averaging may be weighted averaging. For example, the averaging may be a weighted average that is the sum of 0.1 of the intensity values of image frame N, and 0.9 of the intensity values of block X in image frame N–1. Other averaging schemes are contemplated.

Method 200 may also include a brightness control step 284, which may include increasing the brightness of an image frame in step 282. The enhancement of brightness in steps 282 and 284 may be as described previously herein with reference to FIGS. 14-17.

Method 200 concludes with step 290, which may include a conversion from an alternative color space back to RGB (if a conversion from RGB was done in step 220), and communication of output image pixel data to an image data receiver, which may be an image display. In instances in which contrast is being enhanced in a series of images, such as images of a movie or video, an image frame counter is provided. The counter may be a mechanical counter that is included in a device that provides the images as film or prints, or the counter may be in computer software that includes the algorithm. In step 287, when the contrast of a given image has been enhanced, and the output image pixel data is communicated to the image data receiver, the counter is indexed by one count. The new value of the counter is provided at initial step 210, and used in subsequent step 279 in which intensity values are averaged over the current image frame, and preceding image frame(s) as described above.

Adaptive Contrast Using Visual Basis Functions

The second of the broad methods of the present disclosure for performing adaptive contrast in image processing and display involves the use of visual basis functions.

The object of most contrast improvement algorithms is to use the available dynamic range to the maximum. In other words, given a histogram's width (standard deviation, s) the object is to widen the width (increase the standard deviation, s) around the same mean value. Many such algorithms exist that have involved mathematics to handle such cases. Most of these algorithms are not useful because they are suitable only for particular cases, or because of their complexity.

For image processing applications implemented with software, or for applications of low complexity, in accordance with the present disclosure, there is provided a method of producing an output image with enhanced contrast, including a new algorithm that is operable using visual basis functions and brightness improvements. The human visual basis functions are defined based on how the human eye (and brain) perceives and adapts to an input image scene to alter the histogram or the image intensity based on adapting to brightness regions in the image. Human vision changes its processing when looking into shadows to see more detail, with adjacent scene areas affecting the overall adaptation, similar to the use of region overlap in previously described adaptive contrast methods and algorithms of the present invention. Human vision also changes its processing when looking into bright scene areas, with adjacent scene areas affecting the overall adaptation, also similar to the previously described use of region overlap in the present invention. Human vision also blends adjacent regions by scanning across the region boundaries to smooth the transitions, similar to the previously described region boundary look up table averaging of the present invention.

Figure 11:
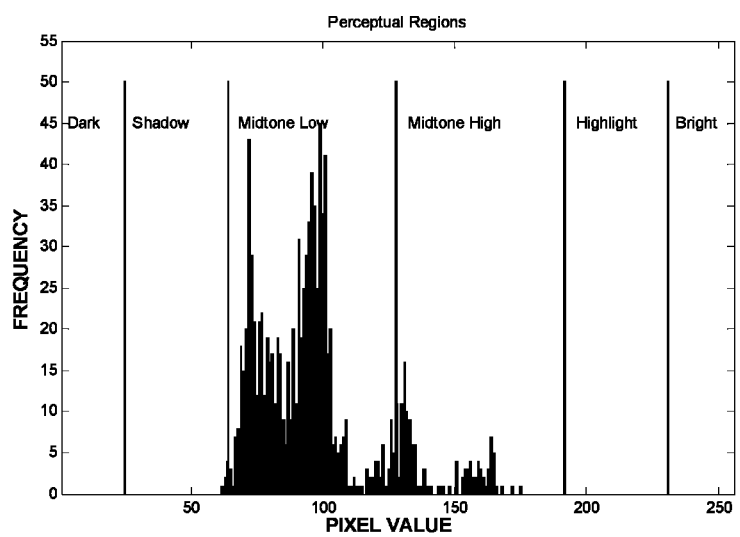
FIG. 11 is a histogram of human vision basis functions that may be used in an alternative embodiment of a method of adaptive contrast in accordance with the present disclosure.

To illustrate these principles, consider the pixel value regions defined in FIG. 11. (The regions shown in FIG. 11 are one exemplary case of regions.) In this example, for the particular input image that is characterized by the histogram of FIG. 11, it can be seen that the regions are defined as Dark, Shadow, Midtone Low, Midtone High, Highlight, and Bright. It can also be seen that there is a significant concentration of pixels in the Midtone Low region.

Figure 12:
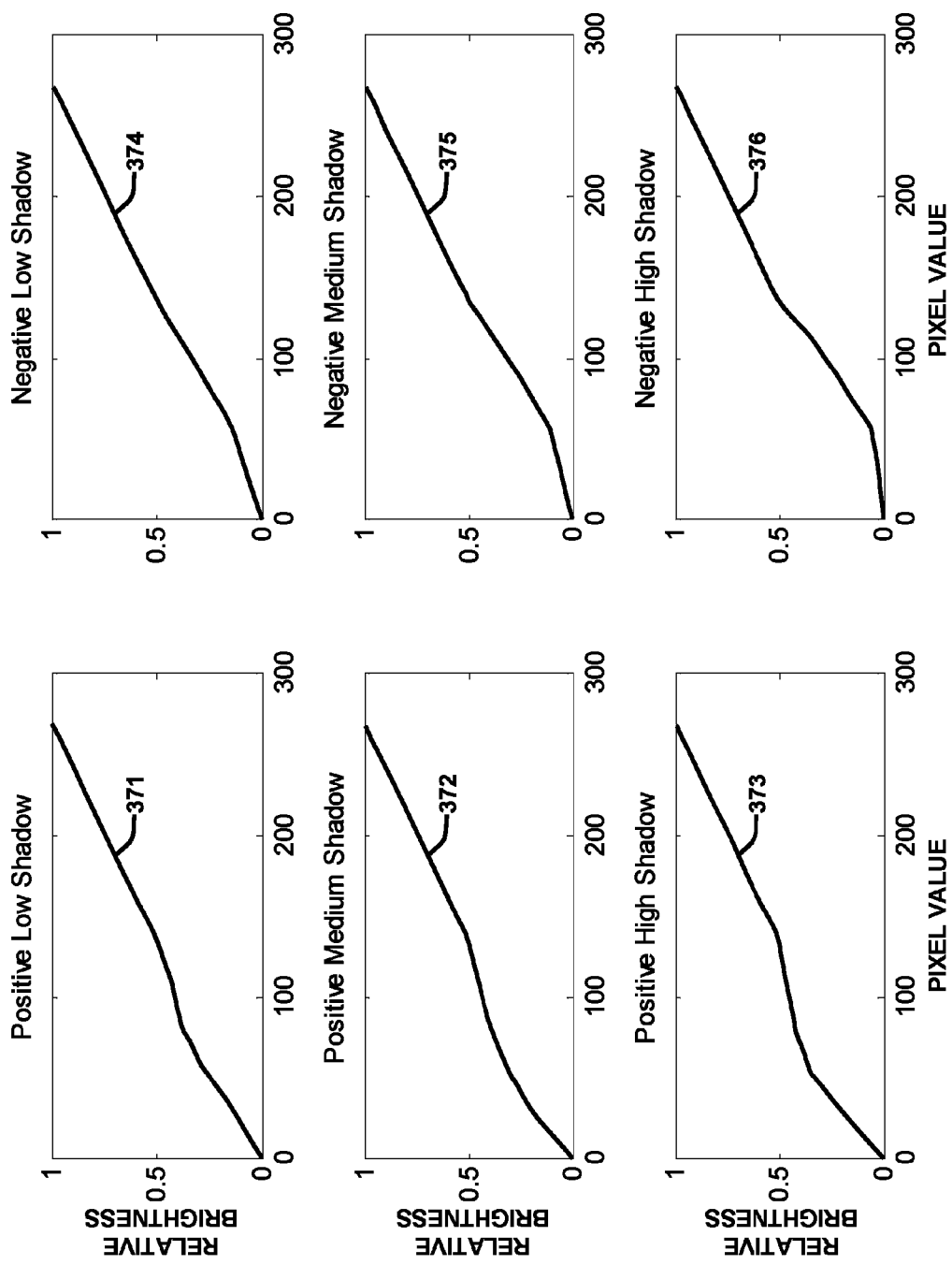
FIG. 12 is a set of graphical illustrations of human vision basis functions over a range of shadow conditions.

Human vision may be characterized as using simple region rules to define the basis functions. Certain ranges of pixel values may be defined as the regions, such as the above-referenced regions of FIG. 11, and for each of the regions, a set of basis functions may be defined. By way of example, for shadow regions, such as the shadow region shown in FIG. 11, the human vision basis function examples may be defined as follows:

1) Positive Low Shadow
2) Positive Medium Shadow
3) Positive High Shadow
4) Negative Low Shadow
5) Negative Medium Shadow
6) Negative High Shadow These human vision basis functions 371-376 are shown in FIG. 12 for illustration. As noted above, human vision basis functions may be created for all of the different types of regions that may be present in an image or sequence of images (i.e., a video or movie), depending upon the particular application. The basis functions, such as functions 371-376 of FIG. 12, are based upon human visual perception of brightness, and are empirical functions that may be changed according to the requirements of the imaging application or the type of display that is used to display the output image. For instance, for daylight viewing, it may be only necessary to increase the brightness of the shadow regions in the input image without altering any other areas of the image. In that case, only functions in the first column of FIG. 12, i.e., the respective basis functions 371-373 for positive low, medium, and high shadow regions in the input image would be applicable or even modified, to result in even lower input pixel values. It is further noted that there is no necessary condition of orthogonality on the functions.

In an alternative adaptive contrast algorithm for enhancing image contrast, for any particular pixel value region defined for an image, a simple combination of these human vision basis functions may be used to define Input/Output curves, which may then be used in a manner similar the method 100 shown in FIG. 2, and described previously herein. For example, given the histogram in FIG. 11, the following equation could define the IO curve, i.e., the sum of the selected basis functions that are chosen for the particular image contrast application:

$$q_{B(x,y)}=\text{Positive Medium Midtone Low+Positive Medium Midtone High},$$

where $q_{B(x, y)}$ is cumulative sum of the selected basis functions, x is the pixel value of the basis functions, and y is the relative brightness for the respective selected basis functions.

Alternatively, if some low intensity values are desired, the IO curve could be defined as:

$$q_{B(x,y)}=\text{Negative Low Shadow+Positive Medium Midtone Low+Positive Medium Midtone High}$$

It can be seen that a Negative Low Shadow basis function has been added to the sum of basis functions that define the IO curve $q_{B(x, y)}$. The decision to add the third basis function to obtain this IO curve, as well as defining other IO curves with other combinations of basis functions is a heuristic decision, i.e., based upon experience in applying the algorithm with various combinations of basis functions. However, it is noted that the ability to make effective decisions on the combinations is readily attained by one skilled in the art of image processing.

Figure 13A:
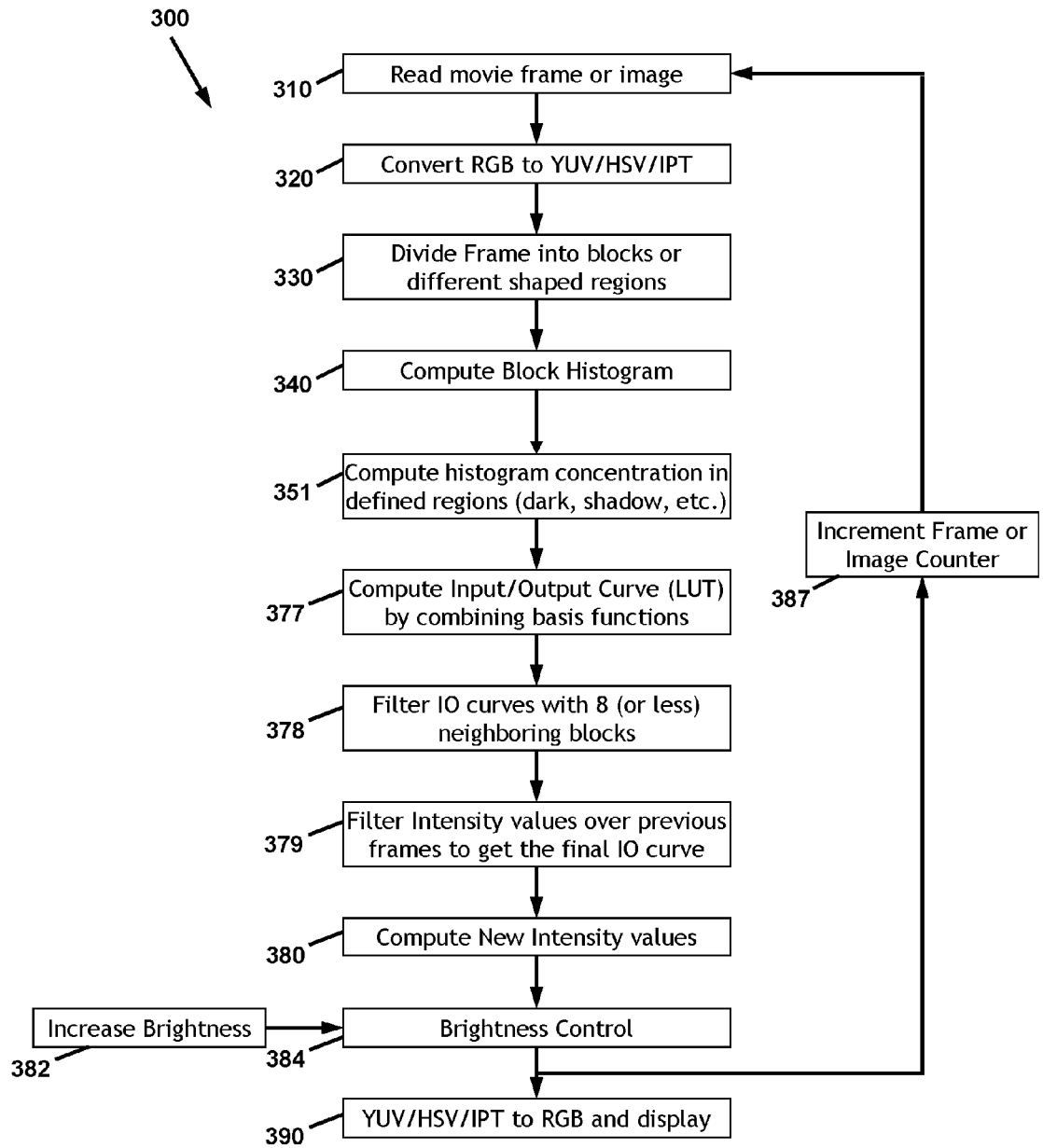
FIG. 13A is a flowchart depicting a method of performing adaptive contrast enhancement on an image or sequence of images using human vision basis functions.

FIG. 13A is a flowchart depicting a method of performing adaptive contrast enhancement on an image or sequence of images using human vision basis functions, and applying the above-described principles. In the method 300 of FIG. 13A, the steps 310-340 are the same as steps 210-240 of method 200 of FIG. 13; in like manner, the steps 378-390 of method 300 are the same as steps 278-290 of method 200. Where method 300 of FIG. 13A differs from method 200 of FIG. 13 is the performance of steps 351 and 377, instead of steps 242, 245, 250, 260, and 270.

After computing the block histogram for each block in step 340, in step 351, for each block, the histogram concentration is computed in defined regions. For example, if a given block were to have the histogram of FIG. 11, the computation would indicate that there is a high histogram concentration in the Midtone Low region. In such regions where there is a high histogram concentration that exceeds a predetermined threshold, enhancement of the contrast is beneficial. (In other regions, the determination to enhance contrast may be made based upon the histogram concentration being less than a predetermined threshold.) Thus for any such regions, in step 377, a combination of basis functions is made from a predetermined set of basis functions to define an IO curve for that block. By way of example, and referring again to FIG. 12, which depicts the set of basis functions 371-376 for the Midtone Low region of the histogram of FIG. 11, a subset of the basis functions 371-376 would be heuristically selected to be combined, thus defining the IO curve to be applied to the particular block.

Following step 377, the remaining steps 378-390 are executed to complete the method 300. In final step 290, an image data receiving device receives the output image pixel data. The data receiving device may be a display, which displays the resulting output image.

It is noted that the methods of the present invention may be performed by a device for enhancing contrast in an image comprising a processor in communication with a data input port for receiving input data of a digital image, and also in communication with a non-transitory computer readable medium that stores one or more of the adaptive contrast algorithms described herein. The algorithms are communicable to and executable by the processor. The device may be further comprised of an image data receiver that is in communication with the processor, and that receives the output image pixel data defining output image pixels of the output image. In certain embodiments, the image data receiver may be a non-transitory computer readable medium, such as a memory, or a data storage disc, either of which may be portable, i.e., separable from the processor and transportable to interface with another computer or communications port or network. In other embodiments, the image data receiver may be an image display.

In certain embodiments, the device for enhancing contrast and (optionally) brightness of an image may include a camera that captures still images or a sequence of images as a video or movie. In such embodiments, the contrast and/or brightness enhancements of the images may be performed in real time using the device itself.

Alternatively, the methods may be performed in real time using a device that is separate from the device that is providing the input image. Such separate devices include but are not limited to a separate computer, tablet, or smartphone in the hardware and/or software thereof, in an image or video display, in an attached processor of images received via cable or wireless transmission, or in a central processing facility prior to image or video creation or reprocessing for improved libraries or distribution.

It is, therefore, apparent that there has been provided, in accordance with the present invention, a method for rendering of color images that are perceived to be of high aesthetic quality using adaptive contrast algorithms. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

What is claimed is:

1. A method of producing an output image with enhanced contrast, the method comprising:
    a) dividing a digital input image comprised of input image luma pixels into a plurality of blocks;
    b) for each of the blocks, computing a histogram of values of luma pixels, the values of luma pixels subdivided into a plurality of histogram bins;
    c) for each of the blocks, applying a predetermined threshold value to the histogram bins of the histogram, wherein for any histogram bin containing a quantity of luma pixels that exceeds the threshold value, the number of luma pixels in excess of the threshold value are distributed evenly among histogram bins that do not contain a quantity of luma pixels that exceeds the threshold value, thereby computing a revised histogram of values of luma pixels in the histogram bins;
    d) for each of the blocks, repeatedly determining if the revised histogram contains a quantity of luma pixels that exceeds the threshold value, and applying the predetermined threshold value to the histogram bins of the revised histogram, distributing luma pixels in excess of the threshold value evenly among histogram bins that do not contain a quantity of luma pixels that exceeds the threshold value, and computing a new histogram of values of luma pixels in the histogram bins until the new histogram of values of luma pixels does not contain a quantity of luma pixels that exceeds the threshold value;
    e) for each of the blocks, computing a cumulative histogram;
    f) for each of the blocks, scaling the cumulative histogram to compute an input-output curve;
    g) for each of the blocks, applying the input-output curve to the input pixel intensities to determine initial output pixel intensities;
    h) for each of the blocks, defining boundary portions that are contiguous with neighboring blocks;
    i) for each of the blocks, averaging the output pixel intensities of each of its boundary portions with the output pixel intensities of the respective contiguous neighboring blocks to define averaged output pixel intensities of each of the boundary portions of each of the blocks; and
    j) compiling the blocks comprised of pixels with averaged output pixel intensities to produce output image pixel data; and
    k) communicating the output image pixel data to an image data receiver.

2. The method of claim 1, wherein a look-up table is compiled based upon the input-output curve, the look-up table containing output values for each of the luma pixel values.

3. The method of claim 1, wherein the threshold value is variable over a range of luma pixel values that define the histogram bins.

4. The method of claim 3, wherein the threshold value is variable to correspond to requirements of an image display device.

5. The method of claim 3, wherein the threshold value is variable over a range of luma pixel values that correspond to shadow regions in the image.

6. The method of claim 1, wherein the digital input image is a color image.

7. The method of claim 6, wherein the digital input image is defined using an RGB color space, and the method is further comprised of performing a color transformation to transform the digital input image to a color space selected from CieL*a*b*, CieLUV, CieIPT, YUV, and HSV.

8. The method of claim 7, further comprising transforming the output image pixel data back to the RGB color space before displaying the image.

9. The method of claim 6, wherein the digital input image is defined using an RGB color space, and the method is further comprised of performing a color transformation to transform the digital input image to CieIPT color space.

10. The method of claim 1, further comprising producing a sequence of output images from a sequence of digital input images, each of the digital input images processed according to the steps of claim 1 and communicated to the image data receiver as the sequence of output images.

11. The method of claim 1, wherein the output image has at least one of enhanced contrast or enhanced brightness as perceived by a human observer.

12. The method of claim 1, further comprising at least one of suppressing noise in the input image or maintaining the perceived appearance of areas of uniform intensity in the input image by performing at least one of:
    a) setting the threshold value to no greater than a small percentage of the maximum value in the histogram of values of luma pixels;
    b) for each value of the input-output curve, maintaining that value within a defined percentage of the immediately preceding value, and not lower than the preceding value; or
    c) for histogram bins that contribute less than a predetermined lower limit amount to the histogram of values of luma pixels, setting such histogram values to zero.

13. The method of claim 1, further comprising for each block, defining the output pixel intensities by averaging with output pixel intensities of at least a portion of the neighboring blocks.

14. The method of claim 1, wherein the input image is a first input image and the output image is a first output image, and the method further comprises enhancing contrast of a sequence of additional input images defining a video, wherein for each block of the first of the sequence of additional input images through the last of the sequence of additional input images, the output pixel intensities are defined by averaging with the output pixel intensities of that block in at least the first preceding output image of the sequence.

15. The method of claim 1, wherein the image data receiver is a display device and the method further comprises displaying the image on the display device.

16. A method of producing an output image with enhanced contrast, the method comprising:
   a) dividing a digital input image comprised of input image luma pixels into a plurality of blocks;
   b) for each of the blocks, computing a histogram of values of luma pixels, the values of luma pixels subdivided into a plurality of histogram bins;
   c) for each of the blocks, computing a histogram concentration in each of a plurality of predefined pixel intensity regions;
   d) for each of the blocks, for each predefined pixel intensity region that has a histogram concentration that differs in comparison to a predetermined threshold, combining a selected subset of predefined human vision basis functions for that predefined pixel intensity region to define an input-output curve;
   e) for each of the blocks, applying the input-output curve to the input pixel intensities to determine initial output pixel intensities;
   f) for each of the blocks, defining boundary portions that are contiguous with neighboring blocks;
   g) for each of the blocks, averaging the output pixel intensities of each of its boundary portions with the output pixel intensities of the respective contiguous neighboring blocks to define averaged output pixel intensities of each of the boundary portions of each of the blocks;
   h) compiling the blocks comprised of pixels with averaged output pixel intensities to produce output image pixel data; and
   i) communicating the output image pixel data to an image data receiver.

17. The method of claim 16, wherein the digital input image is a color image.

18. The method of claim 16, further comprising producing a sequence of output images from a sequence of digital input images, each of the digital input images processed according to the steps of claim 16 and communicated to the image data receiver as the sequence of output images.

19. The method of claim 16, further comprising for each block, defining the output pixel intensities by averaging with output pixel intensities of at least a portion of the neighboring blocks.

20. The method of claim 16, wherein the input image is a first input image and the output image is a first output image, and the method further comprises enhancing contrast of a sequence of additional input images defining a video, wherein for each block of the first of the sequence of additional input images through the last of the sequence of additional input images, the output pixel intensities are defined by averaging with the output pixel intensities of that block in at least the first preceding output image of the sequence.

21. The method of claim 16, wherein the image data receiver is a display device and the method further comprises displaying the image on the display device.

22. A device for providing an image with enhanced contrast, the device comprising a processor in communication with a first non-transitory computer readable medium storing an algorithm communicable to and executable by the processor, and including the steps of:
   a) dividing a digital input image comprised of input image luma pixels into a plurality of blocks;
   b) for each of the blocks, computing a histogram of values of luma pixels, the values of luma pixels subdivided into a plurality of histogram bins;
   c) for each of the blocks, applying a predetermined threshold value to the histogram bins of the histogram, wherein for any histogram bin containing a quantity of luma pixels that exceeds the threshold value, the number of luma pixels in excess of the threshold value are distributed evenly among histogram bins that do not contain a quantity of luma pixels that exceeds the threshold value, thereby computing a revised histogram of values of luma pixels in the histogram bins;
   d) for each of the blocks, repeatedly determining if the revised histogram contains a quantity of luma pixels that exceeds the threshold value, and applying the predetermined threshold value to the histogram bins of the revised histogram, distributing luma pixels in excess of the threshold value evenly among histogram bins that do not contain a quantity of luma pixels that exceeds the threshold value, and computing a new histogram of values of luma pixels in the histogram bins until the new histogram of values of luma pixels does not contain a quantity of luma pixels that exceeds the threshold value;
   e) for each of the blocks, computing a cumulative histogram;
   f) for each of the blocks, scaling the cumulative histogram to compute an input-output curve;
   g) for each of the blocks, applying the input-output curve to the input pixel intensities to determine initial output pixel intensities;
   h) for each of the blocks, defining boundary portions that are contiguous with neighboring blocks;
   i) for each of the blocks, averaging the output pixel intensities of each of its boundary portions with the output pixel intensities of the respective contiguous neighboring blocks to define averaged output pixel intensities of each of the boundary portions of each of the blocks; and
   j) compiling the blocks comprised of pixels with averaged output pixel intensities to produce output image pixel data; and
   k) communicating the output image pixel data to an image data receiver.

23. The device of claim 22, further comprising the image data receiver.

24. The device of claim 22, wherein the image data receiver is an image display.

25. The device of claim 22, further comprising a data input port in communication with a source of the digital input image and in communication with the processor.

26. The device of claim 25, wherein the source of the digital input image is a second non-transitory computer readable medium.

* * * * *